(12) United States Patent
Yousif (10) Patent No.: US 8,080,118 B2
(45) Date of Patent: Dec. 20, 2011

(54) TWO-PIECE CONTAINER SEAL AND METHOD OF MANUFACTURE

(75) Inventor: Paul E. Yousif, Wheaton, IL (US)

(73) Assignee: Tech-Seal Products, Inc., Schaumburg, IL (US)

( * ) Notice: Subject to any disclaimer, the term of this patent is extended or adjusted under 35 U.S.C. 154(b) by 147 days.

(21) Appl. No.: 12/657,189

(22) Filed: Jan. 14, 2010

(65) Prior Publication Data
US 2010/0116410 A1  May 13, 2010

Related U.S. Application Data (62) Division of application No. 11/173,474, filed on Jun. 30, 2005, now Pat. No. 7,648,764.

(51) Int. Cl.
*B32B 37/00* (2006.01)

(52) U.S. Cl. ....... 156/73.1; 156/267; 156/269; 156/290; 156/308.4

(58) Field of Classification Search .................... 156/69, 156/73.1, 250, 267, 269, 290, 308.2, 308.4, 156/580.1, 580.2
See application file for complete search history.

(56) References Cited

U.S. PATENT DOCUMENTS

| | | |
|---|---|---|
| 4,754,890 A | 7/1988 | Ullman et al. |
| 4,767,016 A | 8/1988 | Cook, Jr. et al. |
| 4,778,698 A | 10/1988 | Ou-Yang |
| 4,822,326 A | 4/1989 | Ullman et al. |
| 4,917,949 A | 4/1990 | Yousif |
| 4,934,544 A | 6/1990 | Han et al. |
| 5,004,111 A | 4/1991 | McCarthy |
| 5,012,946 A | 5/1991 | McCarthy |
| 5,184,746 A | 2/1993 | Moore et al. |
| 5,197,618 A | 3/1993 | Goth |
| 5,265,745 A | 11/1993 | Pereyra et al. |
| 5,289,932 A * | 3/1994 | Dimeo et al. ................. 215/349 |

(Continued)

FOREIGN PATENT DOCUMENTS
WO  WO 97/02997  1/1997

OTHER PUBLICATIONS

Ultrasonic Plastics Assembly, Chapter XII-Fabric and Film Sealing, Branson Ultrasonics Corporation, Danbury Conn. pp. 89-93 (1979).
Ultrasonic Welding Techniqe, TWI World Centre for Materials Joining Technology, www.twi.co/j32k/protected/band_3/pjkultrason.html. p. 1-4, accessed Nov. 18, 2004.
Zito, B., Does Frequency Matter? Comparing Efficiency of Induction Cap Sealers, Food & Drug Packaging, pp. 1-2, Aug. 1986.
Ultrasonics, Basic Principles and Design Guidelines, Hermann Ultraschalltechnik GmbH & Co., KG, Karlsbad, Germany, 1-16.

*Primary Examiner* — James Sells
(74) *Attorney, Agent, or Firm* — Olson & Cepuritis, Ltd.

(57) ABSTRACT

The present invention provides an improved method of preparing a two-piece container seal. The method comprises contacting a first thermoplastic surface of a moving web of a first flexible sheet material with a second thermoplastic surface of a moving web of a second flexible sheet material, the webs of first and second flexible sheet material moving at substantially the same speed and in the same direction; ultrasonically forming at least one array of spaced, frangible ultrasonic welds between the first and second thermoplastic surfaces, thereby producing a flexible multilayer sheet material having an adhesive-free interface between the first and second thermoplastic surfaces thereof; and cutting a container seal from the multilayer sheet material.

18 Claims, 4 Drawing Sheets

U.S. PATENT DOCUMENTS

| | | |
|---|---|---|
| 5,372,268 A | 12/1994 | Han |
| 5,433,992 A | 7/1995 | Galda et al. |
| 5,514,442 A | 5/1996 | Galda et al. |
| 5,669,521 A | 9/1997 | Wiening et al. |
| 5,702,015 A | 12/1997 | Giles et al. |
| 6,082,566 A | 7/2000 | Yousif et al. |
| 6,174,274 B1 | 1/2001 | Hawkins et al. |
| 6,185,906 B1 * | 2/2001 | Mogard et al. .................. 53/410 |
| 6,461,714 B1 | 10/2002 | Giles |
| 7,648,764 B2 * | 1/2010 | Yousif ........................... 428/346 |

* cited by examiner

TWO-PIECE CONTAINER SEAL AND METHOD OF MANUFACTURE

CROSS-REFERENCE TO RELATED APPLICATIONS

This application is a division of U.S. patent application Ser. No. 11/173,474, filed on Jun. 30, 2005 now U.S. Pat. No. 7,648,764, which is incorporated herein by reference in its entirety.

FIELD OF THE INVENTION

The invention relates to improved container sealing materials and methods of manufacture thereof. More particularly, the invention relates to improved container seals having a closure-lining material ultrasonically welded to a sealing material, and methods of manufacturing the container seals.

BACKGROUND OF THE INVENTION

Ultrasonic welding is a bonding process used extensively for bonding plastic materials to one another. Application of concentrated, directed sound waves in the ultrasonic frequency range (i.e., about 10,000 to about 70,000 kiloHertz) to a pair of compatible (i.e., physically and chemically similar) thermoplastic materials in contact with one another leads to a fusion of the contacting surfaces of the thermoplastic materials to form a bond between the materials. The strength of the bond between the materials can be controlled by the ultrasonic energy applied to the interface between the materials.

In a typical ultrasonic welding process, a vibrating metal tool, typically referred to as a "horn", is placed over a region where two compatible thermoplastic materials are in contact. One of the thermoplastic materials rests against a relatively high mass substrate, such as a plate or roller, typically referred to as an "anvil", while the horn is held over the other material opposite the anvil, which acts as a reflector to locally concentrate the energy of the ultrasonic waves in the materials in the region immediately between the anvil and the horn. The horn vibrates at ultrasonic frequencies and the sound waves are transmitted to the thermoplastic materials, either through the air or by direct contact of the horn with the materials. The vibrational energy from the sound waves forces the thermoplastic materials to fuse. The distance between the horn and the thermoplastic materials, the vibrational frequency of the horn, and the thermal properties (e.g., melting point, glass transition temperature, and the like) of the thermoplastic materials can be used to vary the strength of the bond that is formed. Inclusion of raised or depressed areas on the anvil helps to concentrate the ultrasonic energy in the region of the materials over the rased portion of the anvil. This typically results in a stronger weld than that obtained with a uniform "flat" anvil. In some applications the horn is momentarily brought into contact with the materials (referred to as the "plunge method"), whereas in many other applications the horn does not contact the materials at all.

Ultrasonic welding can be applied to moving webs of two compatible thermoplastic materials using a fixed position, vibrating horn and a roller as the anvil. For example, fabrics of thermoplastic fibers and/or thermoplastic films or sheets can be bonded together to form a laminate. If the anvil is provided with locally raised areas on its surface, as described above, such as an array of bars or nubs, an array of intermittent ultrasonic spot-welds can be provided between the materials. This technique has been used to form a two-layer, quilted fabric, such as is frequently used for disposable hospital gowns and diapers. Similarly, use of a narrow roller with projecting teeth as the anvil provides a linear array of spot-welds to thermally "stitch" two thermoplastic sheets together, in a pattern similar to sewn stitches, but without the use of thread and complex sewing machine mechanisms.

Ultrasonic welding provides a bond between thermoplastic materials without clamping or pressing the materials together. Simple contact between materials is sufficient for ultrasonic bonding to take place. Because ultrasonic welding typically involves using an array of localized welds, the overall thickness of the bonded thermoplastic materials is generally maintained in the regions adjacent to welded regions. In contrast, direct thermal bonding of thermoplastic materials generally requires the materials to be clamped or firmly pressed together with significant force for bonding to occur. In the case of laminated sheet materials, the resulting thermally bonded region can be significantly thinner over a larger area than the combined thickness of the two materials compared to ultrasonic welds of the same strength and distributed over the same surface area. Thus, ultrasonically bonded materials generally can be prepared with less deformation of the materials than is obtained with thermal bonding. In addition, ultrasonic bonding generally requires less energy, over all, than thermal bonding, to afford a bonds of similar strength.

Preferably, ultrasonic welding is performed with a patterned anvil, such as an anvil having an array of raised nubs, raised bars, or a combination thereof, usually arranged in a pattern on the anvil. The resulting ultrasonic weld has a pattern of bonded portions, corresponding to regions where there was a raised structure on the anvil, along with non-bonded regions interspersed with the bonded portions. The macroscopic peel-strength of the bond between two ultrasonically welded sheet materials depends on the size and number of the welds between the materials, the strength of the individual welds, the shear-strength of the sheet materials, and the like, as is well known in the ultrasonic welding art.

Ultrasonic welds also avoid excessive melting of layers that typically occurs with conventional thermal bonding processes, particularly when a patterned anvil is used. The publication *Ultrasonic Plastics Assembly* published by Branson Sonic Power Co., Danbury, Conn., (1979), the disclosures of which are incorporated herein by reference, provides an overview of ultrasonic welding as applied to polymeric materials.

It is common practice to seal a container with a sheet material, such as paper, a polymeric film, aluminum foil, or a laminate of paper, polymeric film and/or aluminum foil. The use of such seals, in many cases, has been imposed on the packaging industry by FDA regulations, as a protection against product tampering. Such seals can provide evidence of product tampering, since they are typically destroyed by the process of removing the seal.

It is also common to line the inner surface of container closures with a moderately compressible material, such as a polymeric material, pulp board, or a multilayer laminated combination thereof. When a closure containing the liner material is secured to the finish of a container, such as by applying a torque force to a threaded closure that is engaged with a threaded container finish, the resulting pressure exerted by the closure onto the liner, which is interposed between the closure and the container finish, produces a substantially liquid and/or gas-tight seal. When the closure is removed from the container, the liner remains within the closure. Re-engaging the closure with the container finish reestablishes the seal. Liner materials can utilize a pulp or paper substrate or polymeric materials, such as polyolefin foams or laminated multilayer lining materials comprising a combination of pulp or a polymeric foam along with a polymeric film, metal foil, and the like.

In a typical application, closures for containers are lined with a "two-piece" laminated material having a layer of pulp mounted to a layer of aluminum foil by an intermediate frangible or absorbable adhesive layer (e.g. a layer of wax or other relatively weak adhesive). Such laminated materials also frequently contain a layer of polymer, such as a polyester film, fixed by an adhesive to the foil, and a layer of heat-sealable polymer fixed by an adhesive to the polyester film, coated thereon, or extruded thereon. The laminate is produced and shipped in roll form, which is then cut to the required shape and size, and mounted in a closure with an adhesive or by friction. One portion of the laminate acts as a closure liner, whereas another portion acts as a seal for a container. The wax or weak adhesive bond between the liner portion and the seal portion is designed so that the liner and the seal will separate during the container-sealing process or upon removal of the closure from the container.

In use, a closure lined with a two-piece sealing material is torqued onto a container, such as a bottle or jar, which has been filled with a fluid or solid product. Next, the capped container is passed through a high frequency induction heating unit. During induction heating, radio frequency energy heats the aluminum foil to a temperature in excess of about 65° C., generally about 150° C. or greater. The resulting heat melts the wax in the layer between the pulp and aluminum foil. The melted wax is absorbed by the pulp, causing the pulp to separate from the remainder of the material. The sealing material typically is selected to match the material of construction of the container, and is heat-welded (i.e., heat-sealed) to the finish of the container (i.e., the rim around the access opening of the container) utilizing the heat generated from the induction heating of the aluminum foil. Alternatively, the seal can be affixed over the access opening of a container by an adhesive, in which case the sealing material need not be a heat-sealable polymer, and the container is sealed without recourse to induction heating. When a consumer removes the closure from the container, the pulp layer remains in the closure as a liner, leaving the laminated combination of foil, polymer film, and sealing material over the access opening of the container as seal, to provide evidence of tampering and/or to prevent leakage and contamination of the container contents during storage and shipment. To access the contents of the container, the consumer must pierce the seal to remove it from the container.

Conventional two-piece container seals (i.e., liner and seal combinations) typically use a wax layer in contact with a wax absorbent surface or a weak adhesive cause the liner portion and the seal portion to separate during the sealing process or upon removal of the closure from a sealed container. Accordingly, there is generally a residue of adhesive (e.g., a wax) remaining on the liner portion after separation. Upon re-sealing the container with the lined closure, the contents of the container come into direct contact with the residue. The contact between the adhesive residue and the container contents can be objectionable in some applications, e.g., where the contents of the container includes a solvent capable of dissolving the adhesive, leading to contamination of the contents.

The two-piece container seals of the present invention provide a liner and seal combination having an adhesive-free interface between the liner and seal portions.

SUMMARY OF THE INVENTION

The present invention provides an improved two-piece container seal suitable for sealing a container having a removable closure and for lining said closure. The container seal includes a liner portion ultrasonically welded to a seal portion to provide an adhesive-free interface between the liner and seal portions. The ultrasonically welded bond between the liner portion and seal portion comprises an array of spaced, frangible ultrasonic welds to facilitate separation of the liner from the seal. The two-piece container seal comprises a flexible sealant sheet and a flexible liner sheet ultrasonically welded thereto. The sealant sheet and liner sheet are of the same size and shape. The sealant sheet has a heat-sealable sealing surface and a first thermoplastic surface, and the liner sheet has an outer surface and a second thermoplastic surface that is ultrasonically welded to the first thermoplastic surface of the sealant sheet. The first and second thermoplastic surfaces are in opposed, congruent contact with each other, and the first thermoplastic surface is ultrasonically welded to an opposed portion of the second thermoplastic surface by an array of spaced, frangible ultrasonic welds, affording an adhesive-free interface between the sealant sheet and the liner sheet. Preferably, at least one of the liner sheet and the sealant sheet comprises a layer of metal foil.

The liner sheet and sealant sheet can each, independently comprise a single sheet of thermoplastic material, or preferably at least one of the liner sheet and sealant sheet is a multi-layer laminate.

In use, a two-piece container seal of the invention is sealed over the access opening of a container by thermally sealing the sealing surface of the sealant sheet onto the container finish (i.e., onto the rim surrounding the access opening) to seal the opening. The outer surface of the liner sheet is bound to the inner surface of a closure configured to removably engage the finish of the container surrounding the access opening. When a consumer removes the closure from the container the frangible ultrasonic welds shear away, separating the liner sheet from the sealant sheet. The liner sheet remains in the closure as a liner therefor, while the sealant sheet remains bound to the finish of the container over the access opening as a seal.

The two-piece container seals of the present invention provide a seal that is simple to manufacture and which has an adhesive free interface between the liner and the seal. As a result, the container seals of the present invention are particularly adapted for use in applications where adhesive residues (e.g., wax or other adhesive materials) on the liner surface are undesirable. For example, wax-based adhesives are frequently used to releasably bind a liner to a seal in packaging applications. The liner invariably has residues of wax on its container contacting surface. Wax residues can contaminate a number of products, particularly hydrocarbon-containing liquid products such as petroleum oils, vegetable oils, essential oils, and the like. The two-piece container seals of the present invention avoid such contamination due to the adhesive-free container contacting surface of the resulting liner after separation of the liner sheet from the sealant sheet. In addition, the container seals of the invention provide an improved separation mechanism for integrated liner and seal combinations relative to conventional products utilizing an adhesive or absorbable wax between the liner and seal. The ultrasonic weld bonds between the liner sheet and sealant sheet are also less temperature sensitive than wax bonds.

DETAILED DESCRIPTION OF PREFERRED EMBODIMENTS

As used herein, the term "closure" and grammatical variations thereof, refers to a lid or cap, such as a threaded cap, a lug-type cap, a snap-cap, and the like, that is designed to be repeatedly secured to and removed from a container finish, such that when the cap or lid is secured to the container finish, a seal is formed that protects the contents of the container from contamination and leakage.

The terms "lining material" and "liner" refer to a sheet material that is compressible and preferably semirigid, and is suitable for use within a closure to provide a resealable seal between the closure and a container finish. The term "liner" also refers to a section of lining material that has been cut to fit snugly within a closure against the upper inside surface thereof.

The term "seal" refers to a film or multilayer laminate material that is secured over the finish of a container (e.g., by thermal bonding) to provide an air and/or fluid tight seal. To access the contents of the container, the seal must be broken. A seal can provide evidence of product tampering, for example, when removal of the seal leaves a residue on the finish of the container. A container is typically is fitted with a closure over a container seal. The closure protects the integrity of the seal during shipping and storage. Closures typically include a liner so that after the container seal is removed, the closure can be put back on the container to protect the contents that may remain in the container.

The term "wax", as used herein and in the appended claims is not limited to natural waxes and paraffins, but also encompasses materials commonly referred to as waxes in the packaging and converting industries, such as microcrystalline wax, polyethylene wax, polyisobutylene resins, and so-called synthetic waxes (e.g., amide waxes), as well as mixtures thereof.

As used herein and in the appended claims, the term "thermoplastic" refers to a flexible polymeric material that reversibly softens and flows upon application of heat and pressure to the material. Two thermoplastic materials in contact with one another can be bonded together without the use of an adhesive by application of heat and pressure to the two materials or by means of ultrasonic welding.

The term "ultrasonic welding" as used herein and in the appended claims refers to a process whereby two thermoplastic materials in contact with one another are bonded together by application of concentrated ultrasonic frequency sound waves. The term "ultrasonic weld" as used herein and in the appended claims refers to a bonded portion of two thermoplastic materials created by an ultrasonic welding process. Relatively "strong" ultrasonic welds are characterized by a weld bond strength substantially equal to or exceeding the internal cohesive strength of the individual thermoplastic materials that are bonded together. A relatively "weak" ultrasonic weld is characterized by a weld bond strength that is substantially weaker than the internal cohesive strength of the individual thermoplastic materials that are bonded together. As described herein, relatively weak ultrasonic welds are frangible and can be broken by pulling the thermoplastic materials apart or by applying a shearing force to the welds, thereby separating the thermoplastic materials without substantially tearing the individual thermoplastic materials.

As used herein and in the appended claims, the term "laminate" refers to a composite sheet material comprising at least two layers of individual sheet materials, films or coatings. The layers can be adhesively secured to one another, directly bonded to one another, or can be secured to one another by any combination of adhesive and direct bonding. When used as a verb, the term "laminate" and grammatical variations thereof, refers to the process of bonding sheet materials together in a stacked fashion (i.e., lamination).

The term "directly bonded" and grammatical variations thereof, as used herein and in the appended claims refers to a physical or chemical bond between two sheet materials, which is achieved without the use of an adhesive. For example, a coating of one polymeric material onto a polymeric film web is a directly bonded laminate. Similarly, ultrasonically welded sheet materials are directly bonded to one another.

For convenience, the term "sheet material" and grammatical variations thereof, is used herein and in the appended claims to refers to any flexible material, which has a thickness that is substantially smaller in comparison to its length and breadth, and encompasses multilayer materials, as well as individual layers of sheets, films, coatings, foils, and the like, regardless of their thickness, and regardless of whether the layer was formed in situ by a coating process or was a preformed sheet or film.

The phrase "array of spaced, frangible ultrasonic welds" as used herein and in the appended claims in reference to two-piece container seals means a spaced grouping of relatively weak, fused regions bonding together two thermoplastic surfaces, created by an ultrasonic welding process, each weld being weak enough to break when a force, such as a shearing force, is applied thereto under normal use conditions (i.e., when the sealing surface of the container seal is bound to a container finish, the outer surface of the liner sheet of the container seal is bound to a closure, and the closure is removed from the container, e.g., by twisting off the closure). The ultrasonic welds are preferably spot-welds (e.g., welds having a relatively small surface area relative to the surface area of the thermoplastic surfaces that are bonded together, such as dots or disk-shaped welds, or relatively short lines, "X-shaped" welds, cross-shaped welds, or any other convenient pattern. In one embodiment, the total surface area of the frangible ultrasonic welds between the first and second thermoplastic surfaces encompasses less than about 5 percent of the surface area of each thermoplastic layer. The welds preferably are spaced from one another and arranged in a regular array or pattern, such as spaced, staggered rows of dots, spaced aligned rows of dots, and the like. Alternatively, the welds can be spaced lines. The weld are frangible, i.e., will break apart under the normal level of force (e.g., shearing force) obtained during removal of a closure from a container, such as removal of a threaded lid or cap from a threaded container finish. The ultrasonic welds are produced between two thermoplastic surfaces in direct contact with one another, without any intervening layer of adhesive therebetween, so that the interface between the two thermoplastic surfaces (i.e., the region of contact between the surfaces) is adhesive-free.

A container seal of the invention is suitable for sealing a container having a removable closure and comprises a flexible sealant sheet and a flexible liner sheet bonded thereto. The sealant sheet and liner sheet are of the same size and shape. The sealant sheet has a sealing surface and a first thermoplastic surface, and the liner sheet has an outer surface and a second thermoplastic surface that is ultrasonically welded to first thermoplastic surface of the sealant sheet. The first and second thermoplastic surfaces are in contact in an opposed, congruent relationship to each other, and the first thermoplastic surface is ultrasonically welded to the second thermoplastic surface by an array of spaced, frangible ultrasonic welds, affording an adhesive-free interface therebetween. The sealant sheet and the liner sheet can each independently comprise a single layer of material or multiple layers of material laminated together in a stack. The resulting interface between the two thermoplastic surfaces is adhesive-free, so that after the liner sheet and sealant sheet have been separated by a consumer, the thermoplastic surface of the liner sheet is free of adhesive residues (e.g., particularly wax based adhesives commonly used to releasably bind a liner to a seal), thereby avoiding potential contamination of contents of a container that come into contact with the thermoplastic surface of the liner sheet upon recapping the container. In some embodiments, the two-piece container seal is entirely or substantially entirely adhesive-free, while in other embodiments, adhesive is used in portions of the liner sheet and/or the sealant sheet that do not come into direct contact with the container contents during normal use conditions.

In some embodiments, the sealant sheet can include a tab structure to aid in removing the sealant sheet from the container to access the contents thereof. Various tab structures are well known to those of skill in the container sealing art. A preferred tab structure is a sheet of flexible material having a lower thermoplastic surface and an upper thermoplastic surface. The lower thermoplastic surface is ultrasonically bonded to another thermoplastic material by a band of relatively strong ultrasonic welds. The band is positioned on the sealant sheet such that at least one edge portion of the flexible sheet material is liftable from the underlying layer, and the ultrasonic band is strong enough to remain in tact, without tearing, when the liftable edge portion is grasped and pulled to remove the sealant sheet from a container to which it is bound. The upper thermoplastic surface acts as the first thermoplastic surface of the sealant sheet, and is ultrasonically welded to the second thermoplastic surface of the liner sheet by an array of spaced, frangible ultrasonic welds, as described herein. Such tab structures bound to a seal with a relatively strong band of ultrasonic welds are described in detail in commonly owned, U.S. patent application Ser. No. 11/173,410, filed on Jun. 30, 2005 now abandoned, and entitled TABBED CONTAINER SEAL AND METHOD OF MANUFACTURE, the relevant disclosures of which are incorporated herein by reference.

In one embodiment, the present invention provides a method of manufacturing a two-piece container seal having an adhesive-free interface between the pieces. The method comprises ultrasonically forming an array of spaced, frangible ultrasonic welds between a first moving web of flexible thermoplastic sheet material and a second moving web of flexible thermoplastic sheet material. The first and second webs of thermoplastic material move at substantially the same speed and in the same direction, providing a laminated multilayer sheet material having an adhesive-free interface between the web materials. A two-piece container seal is then cut from the multilayer sheet material (e.g., with a circular die). Optionally, one or more layers of flexible sheet material can be laminated to one or both outer surfaces of the flexible sheet material prior to cutting the container seal from the multilayer sheet material.

In other embodiments, the container seals of the invention can include a removable interlayer portion as part of the sealant sheet or the liner sheet. The removable interlayer portion has two thermoplastic surfaces. One thermoplastic surface of the interlayer forms either the first thermoplastic surface of the sealant sheet or the second thermoplastic surface of the liner sheet. The other thermoplastic layer of the interlayer forms an internal portion of either the sealant sheet or the liner sheet, respectively. The other thermoplastic surface of the interlayer portion is ultrasonically welded to a thermoplastic core layer within the sealant sheet or liner sheet, as the case may be, by a second array of spaced, frangible ultrasonic welds. The second array of ultrasonic welds is produced in a manner so that the total shear force required to break the second array of ultrasonic welds is greater than the total shear force required to break the array of ultrasonic welds connecting the sealant sheet to the liner sheet. In this manner, the sealant sheet separates from the liner sheet in the usual manner, as described herein, when the closure is removed from a container sealed with the container seal of the invention. The interlayer remains attached to the sealant sheet or liner sheet, as the case may be, until the consumer peels the interlayer away. The interlayer preferably includes printing visible on at least one surface thereof, making the interlayer useful as a peelable promotional coupon, game token, or other form of promotional token, if desired.

The sealant sheet and the liner sheet can each independently comprise one or more layers of material, such as cellulose pulp, paper, a synthetic fabric, a polymer film, a polymer foam, a metal foil, and the like, or any combination thereof, the layers being stacked and bound together to form a laminate material. Preferably, at least one of the sealant sheet and the liner sheet includes a layer of metal foil, such as aluminum or aluminum alloy foil.

A sealed container of the present invention comprises a container portion adapted to hold a liquid or solid product therein, and having an access opening surrounded by a container finish. The finish is configured to removably engage a closure over the access opening. The container portion includes a seal over its access opening. The seal comprises a container seal of the invention, the sealant sheet of the container seal being bound to the finish over the access opening of the container. The outer surface of the liner sheet is bound to the inside surface of a closure that is removably engaged with the finish over the container seal.

When a consumer removes the closure from the container, the liner is retained in the closure, breaking or shearing the array of spaced, frangible ultrasonic welds, thereby separating the liner sheet from the sealant sheet, which remains bound to the container finish. The liner sheet remains intact and retained within the closure as a liner therefor, while the sealant sheet remains bound to the finish over the access opening as a seal. The consumer can then remove the seal from the container (e.g., by puncturing the seal and pulling the seal away from the container finish).

Figure 1:
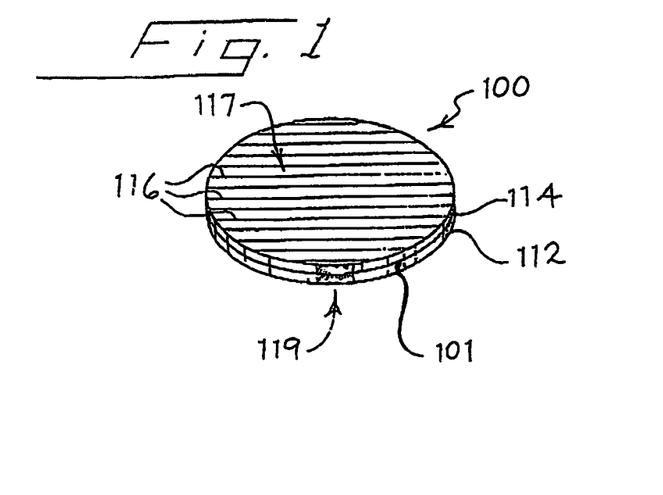
FIG. 1 shows a perspective view of a two-piece container seal having an array of spaced, frangible ultrasonic welds running across the seal.

Referring now to the Drawings, wherein similar reference-numbers refer to correspondingly similar components, FIG. 1 schematically illustrates two-piece container seal 100 of the present invention. Two-piece container seal 100 comprises flexible sealant sheet 112 and flexible liner sheet 114 in congruent opposed contact with each other. Liner sheet 114 and sealant sheet 112 each comprise a sheet of thermoplastic polymer. Liner sheet 114 is ultrasonically welded to sealant sheet 112 by an array of spaced, frangible ultrasonic line-welds 116 between contacting thermoplastic surfaces at interface 101 thereof. Outer surface 117 of liner sheet 114 is shown facing upward in the drawing, whereas sealing surface 119 of sealant sheet 112 faces downward in the drawing. Interface 101 between liner sheet 114 and sealant sheet 112 is adhesive-free. Preferably, liner sheet 114 comprises a thermoplastic polymeric foam, such as a polyethylene terephthalate (PET) foam, and the like, at its thermoplastic surface. Sealant sheet 112 preferably comprises a thermoplastic polymer film (e.g., a PET film) at its thermoplastic surface and a heat-sealable polymeric resin at sealing surface 119.

Figure 2:
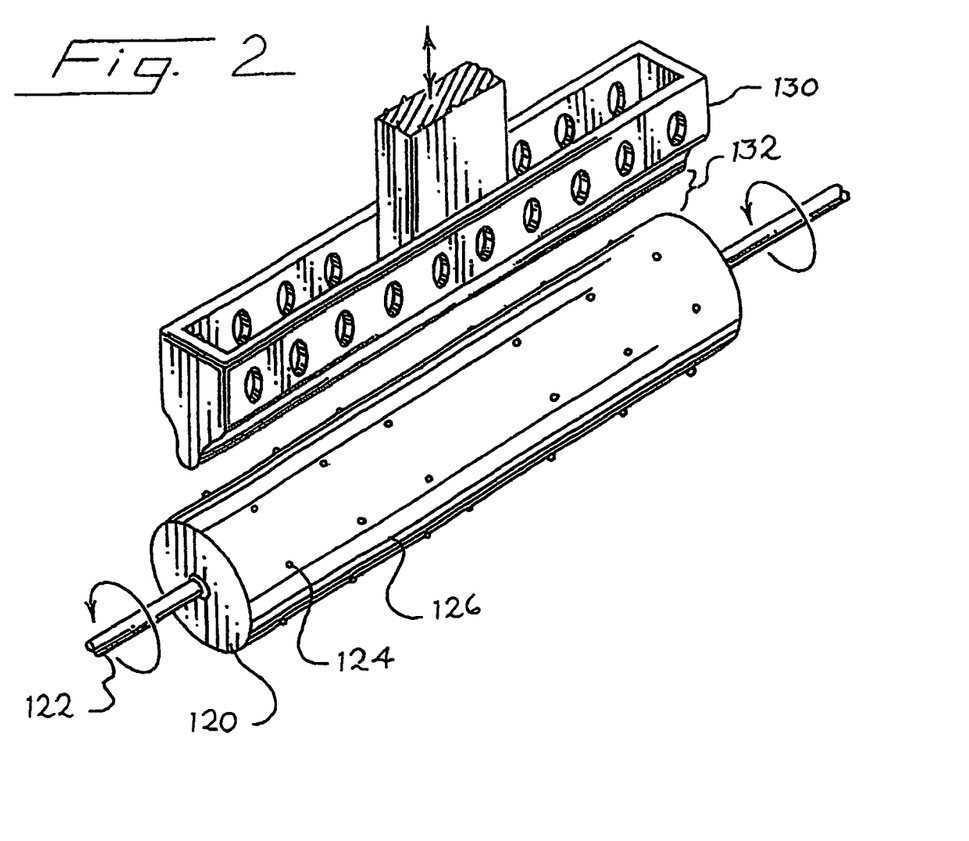
FIG. 2 illustrates a portion of an apparatus for manufacturing an ultrasonically welded laminate having an array of spaced, frangible ultrasonic spot-welds, showing an anvil and horn assembly of the ultrasonic welding apparatus.
Figure 3:
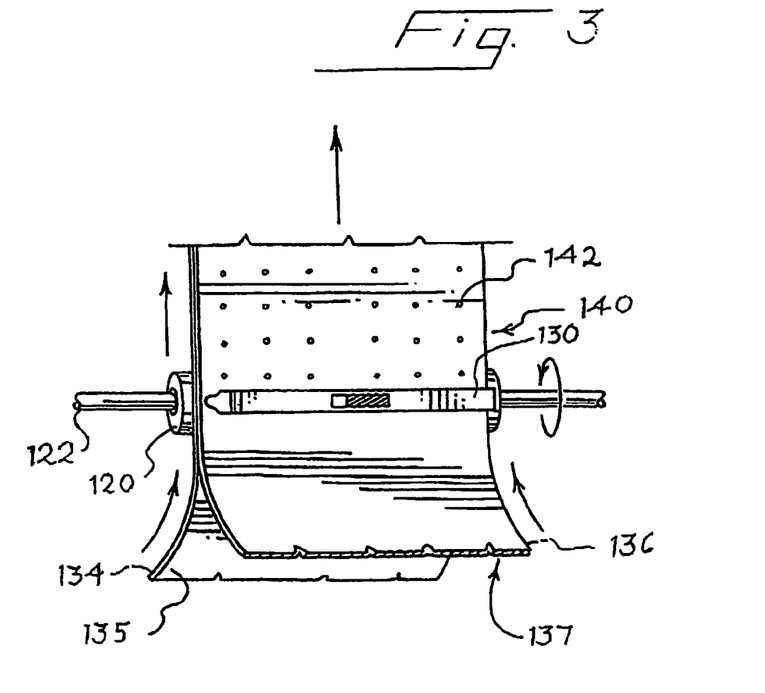
FIG. 3 illustrates a dual web of thermoplastic sheet materials passing between the anvil and horn assembly of FIG. 2 to form an ultrasonically welded, multilayer laminated sheet material.

FIG. 2 illustrates a portion of an apparatus for manufacturing an ultrasonically welded laminate having an array of spaced, frangible ultrasonic spot-welds. The drawing shows cylindrical, rotatable anvil 120 rotationally mounted on axle 122. Anvil 120 includes a pattern of nubs 124 on surface 126, for creating an array of spaced, frangible ultrasonic welds (as illustrated in FIG. 3). Ultrasonic horn assembly 130 is positioned above and parallel to axle 122 and spaced from surface 126 to define a gap 132 between surface 126 and horn assembly 130. Horn assembly 130 is adapted to vibrate at ultrasonic frequencies such that gap 132 varies in size as horn assembly 130 vibrates.

As shown in FIG. 3, in use, sealant sheet 134 having a first thermoplastic surface 135, and liner sheet 136 having second thermoplastic surface 137, are together passed between anvil surface 126 and horn assembly 130, with first thermoplastic surface 135 in contact with second thermoplastic surface 137 in the direction of the arrows. Nubs 124 in combination with the ultrasonic vibrations of horn assembly 130, create in an array of spaced, frangible ultrasonic welds 142 between sealant sheet 134 and liner sheet 136, so that thermoplastic surfaces 135 and 137 of sheets 134 and 136, respectively, are bound together to define laminated sheet material 140, in which thermoplastic surfaces 135 and 137 are bound together without the use of an adhesive.

Figure 4:
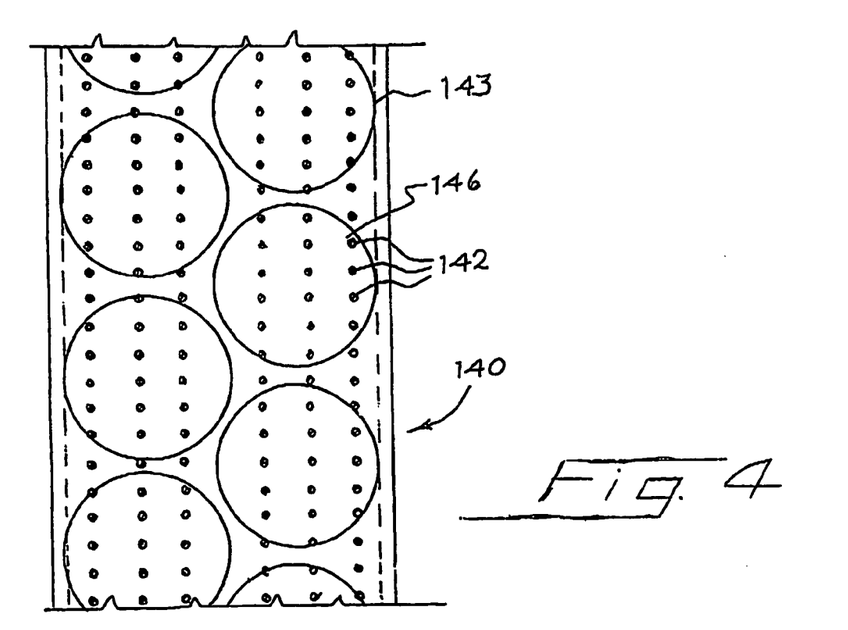
FIG. 4 shows a die-cutting pattern for cutting container seals of the invention from the laminated sheet material formed as shown in FIG. 3.

FIG. 4 illustrates a pattern layout for manufacturing two-piece container seals 146 of the invention from sheet material 140 of FIG. 3. Laminated sheet material 140 includes an array of spaced, frangible ultrasonic welds 142 along the length of sheet material 140. A die-cutting pattern (as indicated by circles 143) is shown in which container seals 146 are to be cut from sheet material 140.

Figure 5:
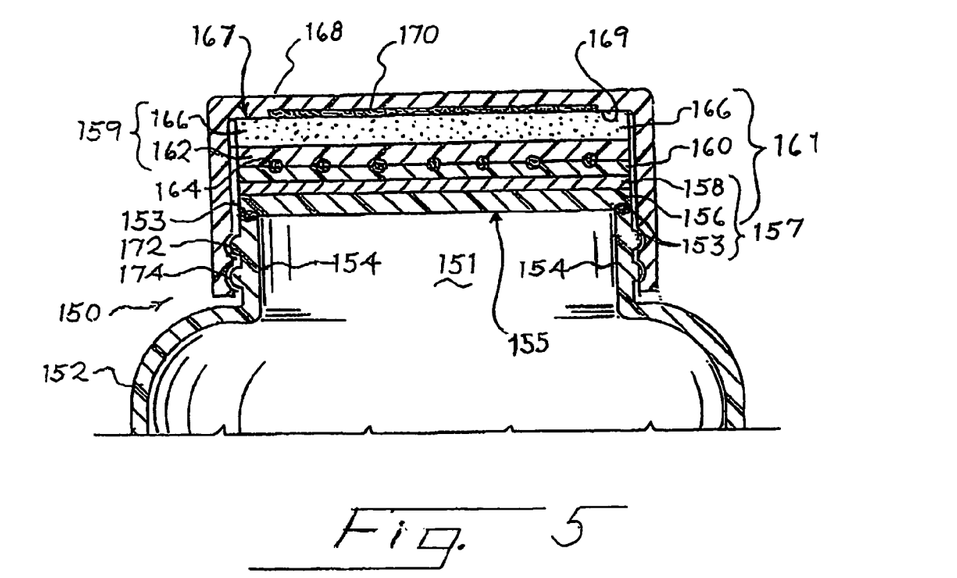
FIG. 5 shows partial cross-section of a sealed container comprising a container seal of the invention.

FIG. 5 shows partial cross-section of sealed container 150 of the invention. Sealed container 150 comprises container portion 152 including finish 154 defining access opening 151. Heat-sealable sealing surface 155 of heat-sealable polymer film 156 sealed to finish 154 by fused portion 153, formed by thermal fusion of surface 155 to finish 154. Polymer film 156 is bound to metal foil 158 (e.g., aluminum foil), either directly or through the use of an adhesive. Metal foil 158 is bound to first thermoplastic film 160, either directly or through the use of an adhesive. Second thermoplastic film 162 is ultrasonically welded to first thermoplastic film 160 by an array of spaced, frangible ultrasonic spot-welds 164. Second thermoplastic film 162 is bound to polymeric foam layer 166, either directly or through the use of an adhesive. Together, heat-sealable polymer film 156, metal foil 158, and first thermoplastic film 160 comprise sealant sheet 157 of two-piece container seal 161. Second thermoplastic film 162 and polymeric foam layer 166, together comprise liner sheet 159. Outer surface 167 of liner sheet 159 is bound to inner surface 169 of closure 168 by hot-melt adhesive 170. Alternatively, hot-melt adhesive 170 can be omitted and liner sheet 159 can be retained in closure 168 by physical means, such as by friction against the inner surface 169 or retained by the physical barrier of threading 172 of closure 168. In some embodiments, liner sheet 159 can be retained in closure 168 by means of a retaining tab, bead, or ridge within the interior of closure 168 between threading 172 and inner surface 169, as is known in the art. Threading 172 is removably engaged with threading 174 of container finish 154, to secure closure 168 to container portion 152.

Figure 6:
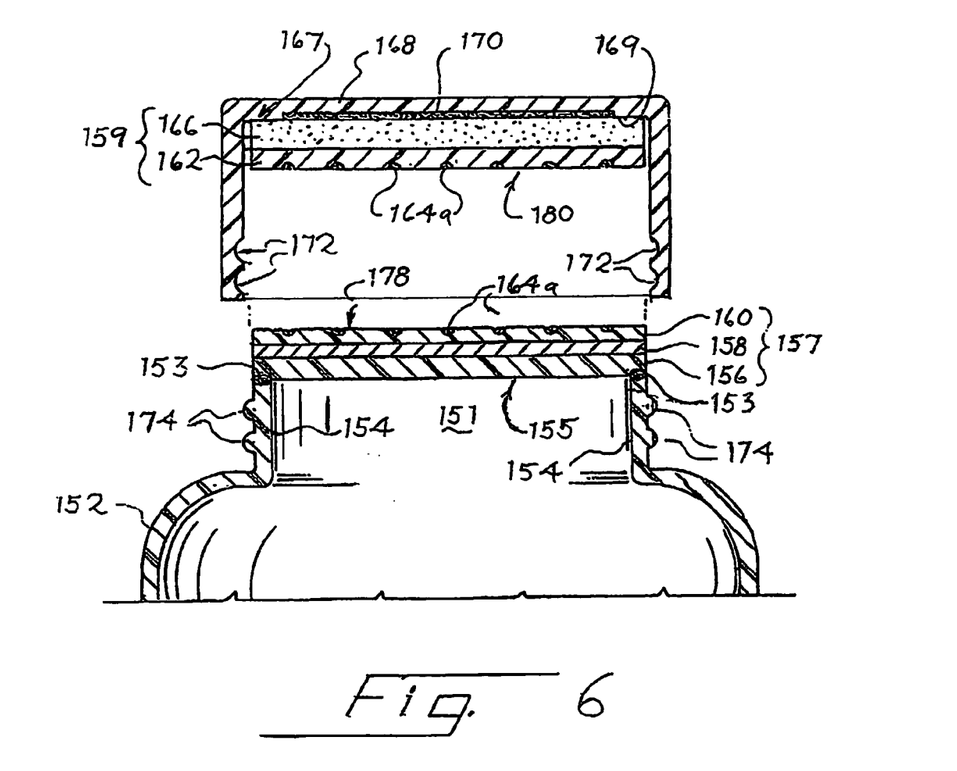
FIG. 6 shows a partial cross-section of the container of FIG. 5 with the closure removed illustrating the breaking of the frangible spot-welds and separation of the liner sheet from the sealant sheet upon removal of the closure from the sealed container.

FIG. 6 shows a partial cross-section of the container of FIG. 5 with closure 168 having been removed, illustrating the breaking of the frangible spot-welds 164 and separation of liner sheet 159 from sealant sheet 157 upon removal of closure 168 from container portion 152. Broken ultrasonic spot-welds 164a no longer connect the first thermoplastic surface 178 of sealant sheet 157 to second thermoplastic surface 180 of liner sheet 159. Sealing surface 155 of sealant sheet 157 remains bound to finish 154 of container portion 152 after removal of closure 168. Liner sheet 159 remains bound or retained within closure 168, and second thermoplastic surface 180 of liner sheet 159 is adhesive-free. A consumer can remove sealant sheet 157 from container portion 152 to access any contents therein. After removal of sealant sheet 157, closure 168, with its liner sheet 159, can be re-engaged with container portion 152, to reseal the container. The adhesive-free second thermoplastic surface 180 of liner sheet 159 is particularly suited for use with container contents that are prone to contamination with adhesive residues.

Figure 7:
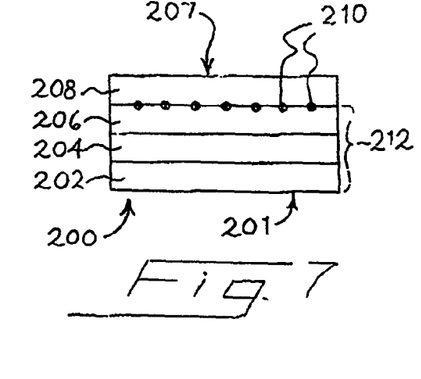
FIG. 7 schematically illustrates the layer arrangement of a preferred two-piece container seal of the invention having a liner sheet comprising a single layer of material and a sealant sheet comprising three layers of material.

FIG. 7 schematically illustrates a preferred two-piece container seal 200, including 4 layers of material. Container seal 200 comprises sealant layer 202 directly bound to a surface of metal foil layer 204 (e.g., aluminum foil having a thickness in the range of about 0.00035 to about 2 mils, preferably about 1 mil). The other surface of metal foil layer 204 is bound either directly or by an adhesive to a surface of first thermoplastic polymer layer 206. The other surface of first thermoplastic polymer layer 206 is bound to a surface of second thermoplastic polymer layer 208 by an array of spaced, frangible ultrasonic welds 210. Second thermoplastic polymer layer 208 constitutes a liner sheet, whereas layers 202, 204, and 206 collectively define sealant sheet 212. Sealant sheet 212 has a sealing surface 201, and second thermoplastic polymer layer 208 (the liner sheet) has an outer surface 207. Sealant layer 202 is preferably a heat-sealable polymeric hot melt coating, as described hereinbelow. First thermoplastic polymer layer 206 is preferably a thermoplastic polymer film, such as a polyethylene terephthalate (PET) film, having a thickness in the range of about 0.5 to about 5 mils, while second thermoplastic polymer layer 208 preferably is a thermoplastic polymeric foam, such as a PET foam.

Figure 8:
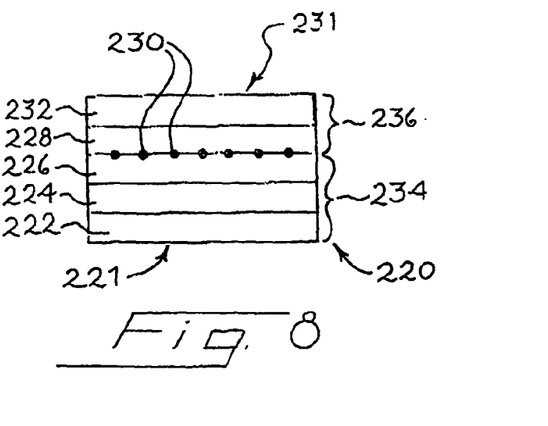
FIG. 8 schematically illustrates the layer arrangement of a preferred two-piece container seal of the invention having a liner sheet comprising two layers of material and a sealant sheet comprising three layers of material.

FIG. 8 schematically illustrates a preferred two-piece container seal 220, including 5 layers of material. Container seal 220 comprises sealant layer 222 bound to a surface of metal foil layer 224 (e.g., aluminum foil having a thickness in the range of about 0.00035 to about 2 mils, preferably about 1 mil, bound to the sealant layer by an adhesive). The other surface of metal foil layer 224 is bound to a surface of first thermoplastic film 226 (e.g., polyethylene, polypropylene, nylon-6, or PET, having a thickness in the range of about 0.5 to about 5 mils bound either directly or by an adhesive to the metal foil). The other surface of first thermoplastic film 226 is bound to a surface of second thermoplastic film 228 (e.g., PET, polyethylene, polypropylene, nylon-6, and the like) by an array of spaced, frangible ultrasonic welds 230. Second thermoplastic film 228 is directly or adhesively bound to backing layer 232, which can be a layer of pulp board, polymeric foam, and the like. Sealant layer 222, metal foil layer 224, and first thermoplastic film 226 together define sealant sheet 234. Second thermoplastic film 228 and backing layer 232 together define liner sheet 236. Sealant sheet 234 has a sealing surface 221, and liner sheet 236 has an outer surface 231. Sealant layer 222 is preferably a heat-sealable polymeric film or coating, as described herein.

Figure 9:
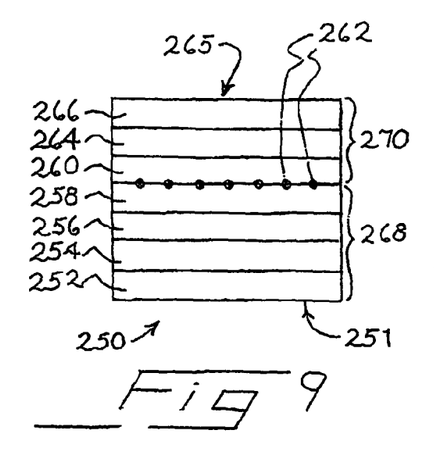
FIG. 9 schematically illustrates the layer arrangement of a preferred two-piece container seal of the invention having a liner sheet comprising three layers of material and a sealant sheet comprising four layers of material.

FIG. 9 schematically illustrates a preferred two-piece container seal 250, including 7 layers of material. Container seal 250 comprises sealant layer 252 (e.g., a heat-sealable film or coating) directly or adhesively bound to a surface of barrier film 254 (e.g., an oxygen barrier, moisture barrier, solvent barrier, or puncture-resistant film, as described herein). The other surface of barrier film 254 is directly or adhesively bound to a surface of metal foil layer 256 (e.g., aluminum foil). The other surface of metal foil layer 256 is directly or adhesively bound to a surface of first thermoplastic film 258 (e.g., PET, polyethylene, polypropylene, nylon-6, and the like). The other surface of first thermoplastic film 258 is bound to a surface of second thermoplastic film 260 (e.g., thermoplastic film of the same material as first thermoplastic film 258) by an array of spaced, frangible ultrasonic welds 262. Second thermoplastic film 260 is directly or adhesively bound to a surface of second barrier film 264 (e.g., an oxygen barrier, moisture barrier, solvent barrier, or puncture-resistant film). The other surface of barrier film 264 is directly or adhesively bound to backing layer 266, which can be a layer of pulp board, polymeric foam, and the like. Sealant layer 252, bather film 254, metal foil layer 256, and first thermoplastic film 258 together define sealant sheet 268. Second thermoplastic film 260, second barrier film 264, and backing layer 266 together define liner sheet 270. Sealant sheet 268 has a sealing surface 251, and liner sheet 270 has an outer surface 265.

Figure 10:
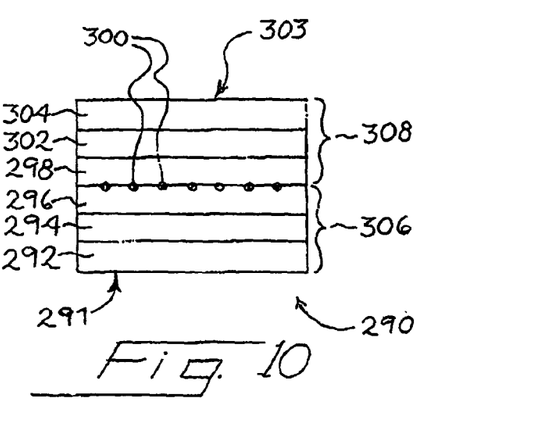
FIG. 10 schematically illustrates the layer arrangement of a preferred two-piece container seal of the invention having a liner sheet comprising three layers of material and a sealant sheet comprising three layers of material.

FIG. 10 schematically illustrates a preferred two-piece container seal 290, including 6 layers of material. Container seal 290 comprises sealant layer 292 (e.g., a heat-sealable film or coating) directly or adhesively bound to a surface of bather film 294 (e.g., an oxygen barrier, moisture barrier, solvent barrier, or puncture-resistant film, as described herein). The other surface of barrier film 294 is directly or adhesively bound to a surface of first thermoplastic film 296 (e.g., PET, polyethylene, polypropylene, nylon-6, and the like). The other surface of first thermoplastic film 296 is bound to a surface of second thermoplastic film 298 (e.g., thermoplastic film of the same material as first thermoplastic film 296) by an array of spaced, frangible ultrasonic welds 300. Second thermoplastic film 298 is directly or adhesively bound to a surface of metal foil layer 302 (e.g., aluminum foil). The other surface of metal foil layer 302 is directly or adhesively bound to backing layer 304, which can be a layer of pulp board, polymeric foam, and the like. Sealant layer 292, barrier film 294, and first thermoplastic film 296 together define sealant sheet 306. Second thermoplastic film 298, metal foil layer 302, and backing layer 304 together define liner sheet 308. Sealant sheet 306 has a sealing surface 291, and liner sheet 308 has an outer surface 303. Sealant sheet 306 preferably is substantially transparent, so that when sealant sheet 306 is sealed over the access opening of a container, and liner sheet 308 has been separated from sealant sheet 306, the contents of the container are visible through sealant sheet 306.

Figure 11:
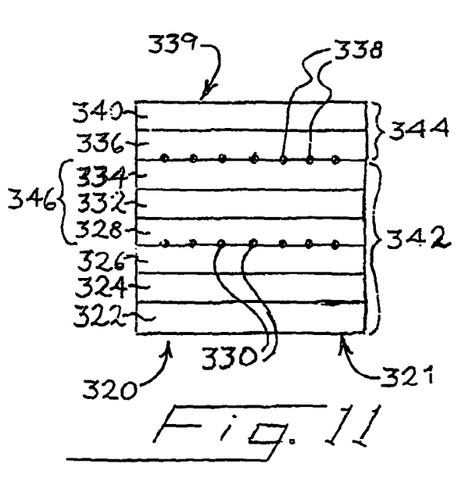
FIG. 11 schematically illustrates the layer arrangement of a preferred container seal of the invention having a liner sheet comprising two layers of material and a sealant sheet comprising six layers of material, the sealant sheet having a removable interlayer portion.

FIG. 11 schematically illustrates a preferred two-piece container seal 320, including 8 layers of material. Container seal 320 comprises sealant layer 322 (e.g., a heat-sealable film or coating) directly or adhesively bound to a surface of barrier film 324 (e.g., an oxygen barrier, moisture barrier, solvent barrier, or puncture-resistant film, as described herein). The other surface of barrier film 324 is directly or adhesively bound to a surface of first thermoplastic film 326 (e.g., PET, polyethylene, polypropylene, nylon-6, and the like). The other surface of first thermoplastic film 326 is bound to a surface of second thermoplastic film 328 (e.g., thermoplastic film of the same material as first thermoplastic film 326) by an array of spaced, frangible ultrasonic welds 330. Second thermoplastic film 328 is directly or adhesively bound to a surface of metal foil layer 332 (e.g., aluminum foil). The other surface of metal foil layer 332 is directly or adhesively bound to a surface of third thermoplastic film 334, which can be made from the same material as first and second thermoplastic films 326 and 328, respectively, or from a different thermoplastic polymer). The other surface of third thermoplastic film 334 is ultrasonically welded to a surface of fourth thermoplastic film 336 by an array of spaced, frangible, ultrasonic welds. Fourth thermoplastic film 336 is preferably made from the same thermoplastic polymer as third thermoplastic film 334. The other surface of fourth thermoplastic film 336 is directly or adhesively bound to backing layer 340, which can be a layer of pulp board, polymeric foam, and the like. Third thermoplastic film 334, metal foil layer 332, second thermoplastic film 328, first thermoplastic film 326, barrier film 324 and sealant layer 322 together define sealant sheet 342. Fourth thermoplastic film 336 and backing layer 340 together define liner sheet 344. Sealant sheet 342 has a sealing surface 321, and liner sheet 344 has an outer surface 339. Third thermoplastic film 334, metal foil layer 332 and second thermoplastic film 328 together define interlayer 346.

The total strength of ultrasonic welds 330 between first and second thermoplastic films 326 and 328 is greater than the total strength of ultrasonic welds 338 between third and fourth thermoplastic films 334 and 336, so that when a container having a closure is sealed with sealing surface 321 over the access opening of the container, and outer surface 339 of liner sheet 344 is held inside of the closure (e.g., by an adhesive or retaining feature), the array of spaced, frangible ultrasonic welds 338 breaks when the closure is removed, due to the shearing force of the closure removal, separating fourth thermoplastic layer 336 from third thermoplastic layer 334. The array of spaced, frangible ultrasonic welds 330 remain intact, so that first and second thermoplastic films 326 and 328, respectively, remain bound together. Interlayer 346 can be separated from the remainder of sealant sheet 342 by peeling interlayer 346 away from first thermoplastic film 326, breaking the array of spaced, frangible ultrasonic welds 330, leaving sealant layer 322, barrier film 324, and first thermoplastic film 326 still bound to the container as a seal therefor. Interlayer 346 can include printed matter visible on a surface thereof, affording a removable promotional coupon, game token, or other promotional token.

Figure 12:
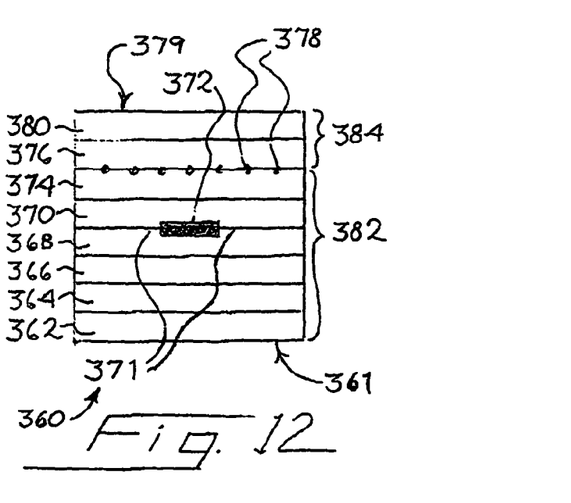
FIG. 12 schematically illustrates the layer arrangement of a preferred two-piece container seal of the invention having a liner sheet comprising two layers of material and a tabbed sealant sheet comprising six layers of material.

FIG. 12 schematically illustrates a preferred two-piece container seal 360, including 8 layers of material. Container seal 360 comprises sealant layer 362 (e.g., a heat-sealable film or coating) directly or adhesively bound to a surface of barrier film 364 (e.g., an oxygen barrier, moisture barrier, solvent barrier, or puncture-resistant film, as described herein). The other surface of barrier film 364 is directly or adhesively bound to a surface of metal foil layer 366 (e.g., aluminum foil, steel foil, and the like). The other surface of metal foil layer 366 is directly or adhesively bound to first intermediate thermoplastic layer 368. A portion of the other surface of first intermediate thermoplastic layer 368 is ultrasonically welded to an opposed portion of second intermediate thermoplastic layer 370 by a band of relatively strong ultrasonic welds 372. Interface portions 371 between intermediate thermoplastic layers 368 and 370 are in contact with one another, but not bound together. The other surface of second intermediate thermoplastic layer 370 is directly or adhesively bound to a surface of first thermoplastic film 374 (e.g., PET, polyethylene, polypropylene, nylon-6, and the like). The other surface of first thermoplastic film 374 is bound to a surface of second thermoplastic film 376 (e.g., thermoplastic film of the same material as first thermoplastic film 374) by an array of spaced, frangible ultrasonic welds 378. Second thermoplastic film 376 is directly or adhesively bound to a surface of backing layer 380, which can be a layer of pulp board, polymeric foam, and the like. Sealant layer 362, barrier film 364, metal foil layer 366, first intermediate thermoplastic layer 368, second intermediate thermoplastic layer 370, and first thermoplastic film 374 together define sealant sheet 382. Second thermoplastic film 376 and backing layer 380 together define liner sheet 384. Sealant sheet 382 has a sealing surface 361, and liner sheet 384 has an outer surface 379. Non-bonded portions of interface 371 form a liftable tab structure to aid in removal of sealant sheet 382 from a container to which it is sealed.

It is to be understood that the positions and sizes of the ultrasonic welds in the container seals shown in the figures, as well as the number and order of the layers thereof, and the materials comprising the layers are merely illustrative, and are not limiting. The patterns of the array of spaced, frangible ultrasonic welds shown in the Figures (e.g., arrays of parallel lines or dots) illustrate two preferred weld patterns, and are not meant to be limiting. Any desired weld pattern can be used in place of the patterns shown in the Figures, including, but not limited to continuous or discontinuous "zig-zag" patterns of bars or dots, patterns of crosses, and the like, as is well known in the ultrasonic welding art. Several suitable weld patterns are shown on page 13 of the brochure entitled *Ultrasonics Basic Principles and Design Guidelines* published by Herrmann Ultraschalltechnik GmbH & Co. KG, Karlsbad, Germany, available on the world wide web (www) at the uniform resource locator (URL) "HerrmannUltraschall" commercial (".com") website, the disclosures of which are incorporated herein by reference. Other examples of weld patterns can be found in Chapter XII of *Ultrasonic Plastics Assembly* published by Branson Sonic Power Co., Danbury, Conn., pp. 89-93 (1979), the disclosures of which are incorporated herein by reference.

The container seals of the present invention can include any combination of single-layer or multilayer sealant sheet and liner sheet, as described above. Multilayer sealant sheets and liner sheets preferably comprise two or more layers, e.g., two-layer, three-layer, four-layer or five-layer structures. Multilayer structures generally comprise sheets of cellulose pulp, paper, synthetic fabric, polymer film, polymer foam, metal foil, and the like, or any combination thereof, adhesively bonded together or thermally fused together, alternatively, some layer can be formed by coating a polymer onto another sheet material, or by extrusion of a polymer onto a sheet material, to form a unitary structure, as is well known in the materials converting and laminating arts.

In one illustrative use, a container seal of the invention can be die-cut to an appropriate size and shape and conveniently placed within a container closure (e.g., a cap) as a single unit. The container seal is sized to fit securely within the closure and is placed in the closure with its sealing surface facing outward. The liner sheet can be bound to the inside top of the closure by an adhesive, such as a hot-melt adhesive or retained in the closure by physical means, such as by friction against the insides of the closure or by the threading in the closure. The closure is then secured to the finish of a container (e.g., a bottle or a jar), for example, by torquing a threaded closure onto a threaded finish of a container after the container has been filled with a product. If the container seal is to be sealed to the finish by an adhesive, the adhesive is applied to the container finish before the sealing surface is placed into contact with the finish.

Heat is applied to the container seal to bond the sealing surface to the container finish. Heat can be applied to the container seal inductively, if at least one of the liner, tab member or sealant sheet includes a metal foil layer, or if the closure is metal. In the inductive heating process, a filled container having a container seal of the invention secured over its access opening is passed through an induction-sealing device in which radio frequency (rf) energy inductively heats the metal foil layer of the seal (or metal closure, as the case may be), typically to a temperature in the range of about 65 to about 150° C. The heat from the metal foil or metal closure softens or melts the heat-sealable surface of the sealant sheet, which then fuses to the finish of the container with which it is in contact.

Upon removal of the closure by a consumer, the shearing force on the liner sheet, which is retained in the closure, breaks the spaced, frangible ultrasonic welds, separating the liner sheet from the sealant sheet, which remains bound to the container finish over the access opening as a seal. A consumer later can remove the seal (e.g., by puncturing and/or peeling the seal away from the container) to access the contents of the container. The liner sheet in the closure acts as a liner to aid in resealing the container when the closure is re-engaged with the container finish.

Liner sheet components preferably include compressible materials, such as a cellulose pulp material, a polymeric foam, or a polymeric film. Preferred polymeric foams include a polyolefin foam, a substituted polyolefin foam, or a polyurethane foam. Suitable polyolefin foams include foams of polyethylene, polypropylene, ethylene propylene copolymers, and blends thereof. Non-limiting examples of suitable substituted polyolefins include polystyrene foam, polyvinyl chloride foam, and foam rubber. Preferably, the polyolefin foam is a polyethylene foam, more preferably a low-density polyethylene foam.

The liner sheet preferably has a thickness in the range of about 15 to about 60 mils (thousandths of an inch), and more preferably about 20 to about 40 mils.

Cellulose pulp-based substrates, which are commonly used in closure liners, can be laminated to other materials such as a metal foil, a polymer film, or to a foil/film laminate using conventional lamination techniques that are well known in the art.

Polymeric foams useful in the container seals of the present invention can be secured to other layers of material, such as a metal foil, paper, synthetic fabric, or polymer film, by lamination or by extruding the foam directly onto a web of the other material, or by extruding a polymeric resin onto a web of the polymeric foam, for example. Methods of extruding polymeric foams are well known in the polymer art. For example, methods of producing polymeric foams are described in A. Brent Strong, *Plastics Materials and Processing,* 2nd Ed., Prentice Hall Inc., Upper Saddle River, N.J., Chapter 17, pp. 589-614 (2000), the disclosure of which is incorporated herein by reference. The polymeric foams can be manufactured using any known foaming process, e.g. by mechanical foaming, chemical foaming, physical foaming, and the like. Preferably, the polymeric foam is formed by chemical foaming with a blowing agent. Blowing agents are well known in the polymer arts.

Suitable blowing agents include the following chemicals designated by the U.S. Environmental Protection Agency as suitable replacements for chlorofluorocarbons (CFC's) and hydrochlorofluorocarbons (HCFCs) for use as blowing agents in polyolefin foams: methylene chloride (dichloromethane); 1,1,1,2-tetrafluoroethane (HFC-134a); 1,1,-difluoroethane (HFC-152a); 1,1,1-trifluoro 2,2-dichloroethane (HCFC-123); 1,1,1-trifluoroethane (HFC-143a); 1,1,1,3,3-pentafluoropropane (HFC-245fa); saturated light hydrocarbons ($C_3$-$C_6$ hydrocarbons); water; and carbon dioxide.

Other suitable blowing agents include chemical blowing agents such as carbonate and azo type compounds. Such compounds include, without being limited thereto, ammonium carbonate, ammonium bicarbonate, potassium bicarbonate, sodium bicarbonate, diazoaminobenzene, diazoaminotoluene, azodicarbonamide, diazoisobutyronitrile, and the like.

Metal foils useful in the container seals of the present invention can comprise any metal that is suitable for use in a closure liner or container seal, for example, steel foil (including stainless steel foil), tin foil, aluminum foil (including aluminum alloy foils), and the like. Choice of a particular metal will depend on the nature of the material to be included in the container to be sealed by the container seal of the invention, although aluminum foil is the most common conventional metal foil used for induction dealing purposes, and is particularly preferred. Preferably, the metal foil is aluminum foil having a thickness in the range of about 0.5 mil to about 2 mils.

Materials suitable for use as a polymer film in the container seals of the invention include, for example, polyolefins such as polyethylene or polypropylene, polyesters such as PET, functionalized polyolefins such as ethylene vinyl alcohol (EVOH) or ethylene vinyl acetate (EVA) polymers, halogenated polyolefins such as polyvinyl chloride (PVC) or polyvinylidene chloride (PVdC), acrylonitrile methacrylate copolymer films (e.g., BAREX® film, BP Chemicals, Inc., Cleveland, Ohio), and the like. The polymer film can be a single layer of polymer, or a multilayer structure comprising two or more layers of polymer bound together. A particularly preferred polymer film is PET film. Preferably, the polymer film has a thickness in the range of about 0.5 to about 2 mils.

Adhesives suitable for securing various layers of the container seals of the invention to one another, if used, include epoxy adhesives, solvent-based cements containing synthetic rubber or a phenolic resin, acrylic adhesives, urethane adhesives, or any other suitable adhesive, waxes (e.g., paraffin, microcrystalline wax, polyethylene wax, polyisobutylene resin, butyl rubber resin, and synthetic waxes such as amide waxes such as stearamide) or a tie-layer. Tie-layers are often used to provide adhesion between a nonpolar polymer, such as polyethylene, and a polar polymer such as ethylene vinyl alcohol (EVOH). Typically, tie-layers are functionalized polyolefins such as ethylene acrylic acid copolymers, ethylene vinyl acetate copolymers (EVA), and the like, as is well known in the art.

One preferred form of adhesive is a solventless adhesive system, such as MOR-FREE® 403A/C117, available from Rohm & Haas Corp., Springhouse, Pa.). Another preferred adhesive is the two part adhesive available under the trade name ADCOTE® 503 adhesive, from Rohm & Haas Corp, which is a polyester resin used in combination with a curing agent such as Coreactant F, also available from Rohm & Haas Corp. Another suitable adhesive is Airflex 426 from Air Products, Inc. Other preferred adhesives include, for example, solventless adhesive systems, which are available from Rohm & Haas, and H. B. Fuller (e.g., Fuller WD4120 and WD4122). Adhesives useful in a variety of applications are discussed in detail in Arthur H. Landrock, *Adhesives Technology Handbook*, Noyes Publications, Park Ridge, N.J., (1985), incorporated herein by reference (hereinafter "Landrock").

If an adhesive is utilized to bond a polymeric foam and/or a polymeric film to another layer of material, the bonding surfaces of the polymer foam or film can be surface-treated to improve adhesion. Suitable surface treatments include, without being limited to, chromic acid etching, corona treatment, oxidizing flame treatment, gas plasma treatment, and the like.

Container seals of the present invention can include materials such as paper, cellulose pulp (e.g., pulp board), or an absorbent synthetic fabric, such as a nonwoven fabric, an absorbent polymeric foam, a porous polymeric film, and the like, if desired, preferably having a thickness in the range of about 1 mil to about 12 mils, more preferably about 2 mils to about 10 mils, and most preferably about 2.5 mils to about 6 mils.

Printed matter can be present on the liner sheet and/or the sealant sheet to provide product identification information, product promotion information, instructions for use of the container contents, and the like, if desired.

Suitable paper and cellulose pulp materials for use in the container seals of the invention include bleached or unbleached Kraft paper, single-layer or multilayer glassine paper, bleached or unbleached cellulose pulp, clay-coated papers, or any other paper or cellulose sheet material commonly used in container seals or liners in the packaging industry.

Synthetic fabrics that are useful as components of the container seals of the invention include nonwoven polyolefin fabrics and nonwoven polyester fabrics. Suitable nonwoven polyolefin fabrics include nonwoven polyethylene materials, such as a microporous polyethylene film or spunbonded high density polyethylene, as well as nonwoven polypropylene, nonwoven ethylene-propylene copolymer, and nonwoven blends thereof. Suitable nonwoven polyester fabrics include nonwoven polyethylene terephthalate fabrics and spunlaced DACRON® polyester-based fabrics available from E.I.

DuPont de Nemours & Co., Inc. of Wilmington, Del. (Dupont), under the trade name SONTARA®. Preferably, the synthetic fabric is an absorbent polyethylene non-woven fabric such as TYVEK® non-woven fabric, available from DuPont, or a microporous polyethylene film sold under the trade name TESLIN® by PPG Industries, Inc., Pittsburgh, Pa.

A barrier film, when present, preferably comprises a polymeric material having oxygen barrier, moisture barrier, solvent barrier, or toughness (i.e, puncture resistance) properties, as desired, based on the type of contents that will be included within a container sealed by the container seal of the invention. The barrier film can be a single layer of polymer, or a multilayer structure comprising two or more layers of polymer either directly bound to one another or adhesively secured to each other. Non-limiting examples of materials that can be used as a moisture bather film include vinyl chloride/vinylidene chloride copolymer (i.e., PVC-PVdC) films marketed by Dow Chemical Company under the trademark SARAN®, polyethylene, oriented polypropylene (OPP), OPP/polyvinyl chloride (PVC) laminates, and OPP/PVC-PVdC laminates. Non-limiting examples of materials that can be used as an oxygen barrier film include PVC-PVdC, PET, PVC-PVdC/PET laminates, acrylonitrile methacrylate copolymer films, PVdC, and OPP/PVC-PVdC laminates. Non-limiting examples of solvent resistant films include PET and polyethylene. Non-limiting examples of puncture resistant films include PET and PVC. Preferred barrier films are PET, PVdC, and acrylonitrile methacrylate copolymer films. Preferably the barrier film has a thickness in the range of about 0.5 to about 3 mils.

The heat-sealable surface of the sealant sheet is a thermoplastic material that will soften and bond to a container finish with which it is in contact when heated at temperatures achieved during typical induction or conduction sealing operations, under the pressure exerted by the closure on the container seal between the closure and the container finish. Typically the pressure on the container seal is achieved by torquing a closure over the container seal onto a container finish with a torque in the range of about 15 inch-pounds to about 90 inch-pounds. Non-limiting examples of materials that can be used as a heat-sealable surface include low-density polyethylene (LDPE), medium density polyethylene (MDPE), polypropylene (PP), ethylene vinyl acetate (EVA), ionomer films, and amorphous PET, including heat-sealable polymeric hot melt coatings, such as an EVA copolymer, a styrene-isoprene-styrene (SIS) copolymer, a styrene-butadiene-styrene (SBS) copolymer, an ethylene ethyl acrylate copolymer (EEA), a polyurethane reactive (PUR) copolymer, and the like. Typically the heat-sealable surface is selected to be of the same material as the container finish or of a material that is compatible with the container finish. Accordingly, a polyethylene film would be selected as a heat-sealable surface to seal a high-density polyethylene container finish. Similarly, a PET film can be used as the heat-sealable surface to seal a PET container finish. Preferably, the heat sealable surface is medium density polyethylene, polypropylene, EVA copolymer, or PET. When a relatively strong, puncture-resistant sealant sheet is desired, a tough barrier film can be included over the heat-sealable film.

Thermoplastic materials, many of which are commodity materials are well known in the art. Non-limiting Examples of thermoplastic materials are described in chapter 6 of A. Brent Strong (ed.) *Plastics Materials and Processing*, Second Edition, Prentice-Hall, Inc., Upper Saddle River, N.J. (2000), chapter 6 of which is incorporated herein by reference. Preferred thermoplastic materials for use as thermoplastic surfaces of the sealing sheet and the tab member include polyesters such as PET, polyamides, such as nylons (e.g., nylon-6), polypropylene, polyethylene, polyethylene copolymers, polyvinyl chloride, blends and alloys thereof, and the like. Particularly preferred thermoplastic materials include PET and nylon-6.

The selection of appropriate shape and dimensions for a container seal to be used with a particular closure and container combination is routine for one of ordinary skill in the packaging art. Typically, the dimensions of the container seal are chosen to be substantially equal to the inside dimensions of the upper surface of the closure, so that the upper surface of the container seal will fit snugly within closure. The thickness of the container seal is selected based on the clearance between the upper inside surface of the closure and the finish of a complementary container. Preferably, the thickness of the container seal is selected so that the container seal is slightly compressed when the material is sealed between the closure and a container finish. Such compression aids in forming a fluid and/or air-tight seal. Container closures are selected to match container finishes of complementary dimensions and design, as is well known in the packaging art.

The container seals of the present invention can be manufactured, in part, using standard coating and lamination techniques that are well known in the art, in combination with ultrasonic welding. For example, a web of substrate material (e.g., pulp board) and a polymer film can be laminated to a sheet of metal foil using one or more conventional adhesives to form a liner sheet. The thermoplastic surface of a sealant sheet material can be ultrasonically welded by an array of spaced, frangible spot-welds to the thermoplastic surface of the liner sheet (e.g., a polymer film) to form a multilayer sheet material. In some embodiments, the sealant sheet will be a multilayer laminate, as will the liner sheet. The resulting roll material can then be die-cut to form container seals of the invention having an integrated, releasable liner portion bound to the sealant sheet. The container seals of the present invention can be manufactured to full machine width in a master roll form, utilizing standard roll coating and laminating equipment in conjunction with ultrasonic welding apparatus, all of which are well known in the materials converting and processing arts. Typically, the master roll of sheet material is slit to a desired width and shipped to a closure manufacturer. The closure manufacturer, in turn, die-cuts the slit master roll to the desired size and shape for use in particular container closures. The die-cut container seals are then inserted or pressed into the closure and sealed to a filled container as described above.

Preferably, the container seal of the invention has an overall thickness in the range of about 8 to about 85 mils, more preferably about 20 to about 40 mils. It is preferred that the liner portion of the material, when present, have a thickness in the range of about 10 to about 40 mils. Preferably, the sealant sheet portion has a total thickness in the range of about 0.5 to about 5 mils, more preferably about 0.5 to about 3 mils.

Any common closure design suitable for use with a liner or tamper evident seal can be used in conjunction with the container seals of the present invention. Preferred closures include standard, continuous threaded (CT) closures, which are well known in the art. Such closures are described, for example J. L. Heid and Maynard A. Joslyn, Eds. *Fundamentals of Food Processing Operations Ingredients, Methods, and Packaging*, The AVI Publishing Company, Inc., Westport, Conn. (1967), pp. 649-655.

Numerous variations and modifications of the embodiments described above may be effected without departing from the spirit and scope of the novel features of the invention. No limitations with respect to the specific embodiments illustrated herein are intended or should be inferred.

I claim:

1. A method of manufacturing a two-piece container seal suitable for sealing a container having a removable closure and for lining said closure, the method comprising:

contacting a first thermoplastic surface of a moving web of a first flexible sheet material with a second thermoplastic surface of a moving web of a second flexible sheet material, the webs of the first and second flexible sheet materials moving at substantially the same speed and in the same direction;

ultrasonically forming at least one array of spaced, frangible ultrasonic welds between the first and second thermoplastic surfaces, thereby producing a flexible multilayer sheet material comprising a first outer surface from the first flexible sheet material, a second outer surface from the second flexible sheet material, and an adhesive-free interface between the first and second thermoplastic surfaces of the first and second flexible sheet materials; and cutting a container seal from the multilayer sheet material;

wherein, when the first outer surface of the container seal is bound over a container finish as a seal and the second outer surface is bound to a closure engaged with the container finish, the first flexible sheet material separates from the second flexible sheet material by shearing of the frangible ultrasonic welds when the closure is removed from the container finish, thereby leaving the first flexible sheet material on the container finish as a seal and leaving the second flexible sheet material as a liner in the closure.

2. The method of claim 1 wherein the first flexible sheet material is a multilayer laminate and the first thermoplastic surface thereof is a layer of thermoplastic polymer.

3. The method of claim 2 wherein the outer surface of the first flexible sheet material comprises a layer of heat-sealable polymer and the multilayer laminate comprises at least one core layer bound between the layer of thermoplastic polymer and the layer of heat-sealable polymer.

4. The method of claim 3 wherein the at least one core layer comprises a layer of metal foil.

5. The method of claim 3 wherein the at least one core layer comprises a barrier film.

6. The method of claim 5 wherein the barrier film is selected from the group consisting of an oxygen barrier film, a moisture barrier film, a solvent barrier film, and a combination thereof.

7. The method of claim 3 wherein the at least one core layer comprises a layer of paper or synthetic fabric.

8. The method of claim 1 wherein at least one of the first and second flexible sheet materials comprises a layer of compressible material.

9. The method of claim 8 wherein the layer of compressible material comprises a layer of polymeric foam or pulp board.

10. The method of claim 9 wherein the layer of compressible material further comprises at least one core layer bound between the layer of polymeric foam or pulp board and a layer of thermoplastic polymer.

11. The method of claim 10 wherein the at least one core layer comprises a layer of metal foil.

12. The method of claim 10 wherein the at least one core layer comprises a barrier film.

13. The method of claim 12 wherein the barrier film is selected from the group consisting of an oxygen barrier film, a moisture barrier film, a solvent barrier film, and a combination thereof.

14. The method of claim 10 wherein the at least one core layer comprises a layer of paper or synthetic fabric.

15. The method of claim 1 wherein the total surface area of the frangible ultrasonic welds between the first and second thermoplastic surfaces encompasses less than about 5 percent of the surface area of each thermoplastic layer.

16. The method of claim 1 wherein the entire container seal is adhesive-free.

17. The method of claim 1 wherein the combined thickness of the container seal after ultrasonic welding is in the range of about 8 to about 85 mils.

18. The method of claim 1 wherein the combined thickness of the container seal after ultrasonic welding is in the range of about 20 to about 40 mils.

* * * * *

UNITED STATES PATENT AND TRADEMARK OFFICE
CERTIFICATE OF CORRECTION

PATENT NO.      : 8,080,118 B2                         Page 1 of 1
APPLICATION NO. : 12/657189
DATED           : December 20, 2011
INVENTOR(S)     : Paul E Yousif It is certified that error appears in the above-identified patent and that said Letters Patent is hereby corrected as shown below:

IN THE SPECIFICATION

Column 8, line 13, after the word "owned," insert --copending--.

Column 11, line 56, delete the word "bather" and insert --barrier--.

line 66, delete the word "bather" and insert --barrier--.

Column 17, line 16, delete the word "bather" and insert --barrier--.

Signed and Sealed this
Third Day of April, 2012

David J. Kappos
*Director of the United States Patent and Trademark Office*